United States Patent
Versteyhe et al.

(10) Patent No.: US 9,657,788 B2
(45) Date of Patent: May 23, 2017

(54) SYSTEM AND METHOD FOR THE UPDATE OF FILL PARAMETERS IN WET CLUTCHES THROUGH CROSS LEARNING

(71) Applicant: DANA BELGIUM N.V., Bruges (BE)

(72) Inventors: Mark R. J. Versteyhe, Oostkamp (BE); Arnout R. L. De Mare, Roosbeek (BE)

(73) Assignee: Spicer Off-Highway Belgium N.V., Bruges (BE)

( * ) Notice: Subject to any disclaimer, the term of this patent is extended or adjusted under 35 U.S.C. 154(b) by 0 days.

(21) Appl. No.: 14/392,102

(22) PCT Filed: Apr. 22, 2014

(86) PCT No.: PCT/EP2014/058133
§ 371 (c)(1),
(2) Date: Oct. 13, 2015

(87) PCT Pub. No.: WO2014/173893
PCT Pub. Date: Oct. 30, 2014

(65) Prior Publication Data
US 2016/0040732 A1    Feb. 11, 2016

Related U.S. Application Data

(60) Provisional application No. 61/814,395, filed on Apr. 22, 2013.

(51) Int. Cl.
*F16D 48/06* (2006.01)
*F16D 48/02* (2006.01)

(52) U.S. Cl.
CPC .............. *F16D 48/06* (2013.01); *F16D 48/02* (2013.01); *F16D 2048/0266* (2013.01); *F16D 2048/0269* (2013.01)

(58) Field of Classification Search
None
See application file for complete search history.

(56) References Cited

U.S. PATENT DOCUMENTS 6,328,674 B1    12/2001    Matsue et al.
6,789,658 B2    9/2004    Busold et al.
(Continued)

FOREIGN PATENT DOCUMENTS

EP    2363313 A1    9/2011

OTHER PUBLICATIONS

European Patent Office, The International Search Report and Written Opinion; Sep. 4, 2014; 8 pages; Rijswijk, Netherlands.
(Continued)

*Primary Examiner* — Edwin A Young
(74) *Attorney, Agent, or Firm* — Marshall & Melhorn, LLC

(57) ABSTRACT

A system and method for updating a set of filling parameters for a wet clutch system is provided. The clutch comprises a piston, a proportional valve, a controller, and a sensor. The method comprises the steps of providing the wet clutch system, providing the set of filling parameters, actuating the wet clutch system based on at least one of the set of filling parameters, sensing a response of the wet clutch system during actuation of the wet clutch system, comparing an observed filling parameter to at least one of the set of filling parameters, calculating a fill error between the observed filling parameter and the at least one of the set of filling parameters, and adjusting a plurality of the set of filling parameters based on the fill error.

20 Claims, 3 Drawing Sheets

(56) References Cited

U.S. PATENT DOCUMENTS

| | | | |
|---|---|---|---|
| 8,662,109 B2* | 3/2014 | Bill | F15B 13/0433 137/625.64 |
| 8,706,368 B2 | 4/2014 | Maigler | |
| 2008/0305931 A1* | 12/2008 | Eich | F16D 48/06 477/174 |

OTHER PUBLICATIONS

Kendall R. Harrell et al.; Apparatus and Method for Controlling the End of Fill of a Fluid Actuated Clutch; Statutory Invention Registration No. US H2031 H issued Jun. 4, 2002.

* cited by examiner

SYSTEM AND METHOD FOR THE UPDATE OF FILL PARAMETERS IN WET CLUTCHES THROUGH CROSS LEARNING

RELATED APPLICATIONS

The present application claims the benefit to U.S. Provisional Application No. 61/814,395 filed on Apr. 22, 2013, which is incorporated herein in its entirety by reference.

FIELD OF THE INVENTION

The present invention relates to the operation of hydraulic clutches and more specifically to an apparatus and method for updating filling parameters for wet plate clutches.

BACKGROUND OF THE INVENTION

A performance of a wet plate clutch may be affected by the operating conditions the clutch is operated in. In addition, certain operational parameters of the wet plate clutch may also be affected by the current and past operating conditions. Such uncertainty of performance or operational parameters may be a result of production tolerances of the wet plate clutch, temperature effects on the wet plate clutch, and wear of the components of the wet plate clutch. By adjusting a set of filling parameters used with the wet plate clutch through a learning process over time, such problems can be overcome.

When a stepped ratio transmission is shifted, clutches of the transmission are engaged and disengaged to facilitate a power transfer through a selected power path and a selected gearing. Typically, when a shift is performed, a first clutch is released (also known as an off-going clutch) by decreasing an oil pressure on a first clutch piston. Simultaneously or shortly thereafter, a second clutch is closed (also known as an on-coming clutch) by increasing an oil pressure on a second clutch piston. Such a shift may be commonly referred to as an "overlap shift" or a "powershift." During an overlap shift, the above described process happens simultaneously in a coordinated manner. In a filling phase of a shift, the second clutch piston is positioned adjacent a set of friction plates of the second clutch by regulating the oil pressure on the second clutch piston.

The positioning of the second clutch piston is performed by sending out a pulse width modulated (also known as PWM) signal with a controller to an electro-proportional valve. In response to the pulse width modulated signal, the electro-proportional valve is at least partially opened, allowing a piston chamber of the second clutch to become pressurized. Depending on a force created by the pressure applied to the piston chamber, a position of the second clutch piston can be controlled. Typically, a goal is to move the second clutch piston as fast as possible towards the set of friction plates of the second clutch, while still being able to smoothly engage the second clutch.

An engagement profile (for applying the pressure) associated with a clutch, which is used to apply a desired movement of the clutch piston, is partially dependent on a plurality of mechanical characteristics of the clutch itself, but also other parameters such as a temperature of an automatic transmission fluid used in the clutch and an amount of air in a plurality of conduits used with the clutch. Generally, such variables are taken into account by scheduling the two parameters with which the engagement profile is parameterized.

However, calculating a correct value for each of these parameters has proven to be difficult. The correct value should be specific for a given transmission or a given clutch. Currently, values used for each of these parameters are calculated using a calibration process. The calibration process is typically performed shortly after manufacturing of the vehicle is complete and at predetermined intervals based on a number of operating hours of the vehicle.

The calibration process is performed in a single, fixed operating condition and may be summarized as a plurality of individual steps. Upon a predetermined number of operating hours of the vehicle, a transmission controller indicates that the recalibration process is advised. Once the recalibration process begins, the transmission controller operates the electro-proportional valve with a plurality of engagement profiles, each having a different set of fill parameters. The transmission controller continues this process until it is detected that the clutch has been filled in a satisfactory manner. The controller determines if the clutch has been filled in the satisfactory manner by monitoring a timing of a drop in a torque converter speed ratio. The drop in the torque converter speed ratio indicates a torque transfer has occurred through the clutch, which is indicative of a piston of the clutch contacting the set of friction plates of the clutch. The calibration process is then repeated for each of the remaining clutches of the transmission.

Using measurements from a signal from at least one sensor used with the clutch, a filling quality of the clutch can also be assessed during normal usage of the system, as opposed to during a specific calibration procedure. As non-limiting examples, a signal from a pressure sensor or a signal from a speed sensor may be used to assess the filling quality of the clutch. At least one feature is defined in the signal which is indicative of an error in the filling process. It is understood that a plurality of features may be defined in the signal or that a combination of features present in the signal may be indicative of an error in the filing process. Once the filling quality of the clutch has been assessed, a correction of at least one of a plurality of erroneous parameters can be calculated. The system and method for updating the set of fill parameters for the wet plate clutch described herein begins with a vehicle including a system capable of online learning.

A process of filling of a clutch is commonly characterized by two main parameters, a fill time and a kiss pressure. These parameters are shown on an exemplary pressure profile, which is illustrated in FIG. 1. A reference of "T_fill" in FIG. 1 indicates the fill time of the exemplary pressure profile, and a reference of "P_kiss" indicates the kiss pressure of the exemplary pressure profile. It should be noted that an apparatus and a method described herein is also applicable when more parameters than a fill time and a kiss pressure are analyzed.

The fill time indicates a length in time of a pressure profile required to fill a piston chamber with hydraulic oil and to position a piston against a set of friction plates of the clutch. The kiss pressure is a pressure following the fill time for a pressure profile. The kiss pressure indicates a hydraulic force necessary to counteract a spring force once the piston is placed against the set of friction plates. While the kiss pressure changes slowly over time as a plurality of mechanical characteristics of a clutch system including the clutch change, the fill time is dependent on other factors. Primarily, the fill time is function of a temperature and a quality of a transmission oil used with the clutch, a pressure signal used with the clutch system, and an amount of time between shifts.

Consequently, a correction on the filling parameters determined by online learning is only applicable to a condition in which a shift used for learning was performed. Further, in the implementation of the above described process, the controller saves the parameters in a multidimensional matrix as a function of a plurality of variables. As non-limiting examples, the variables may be the temperature of the automatic transmission fluid and the time between shifts of the transmission. Further, it is understood that for a given evaluated shift, the given evaluated shift likely did not occur under the exact conditions described on the grid points of the multidimensional matrix. In learning the parameters, the controller also decides how much is learned for the given points forming the grid of the multidimensional matrix.

The system and method for updating the set of fill parameters for the wet plate clutch which uses cross learning described herein solves the problems described hereinabove by proposing a structured way to update points of the multidimensional matrix in conditions that deviate from the conditions in which a given parameter was learned.

It would be advantageous to develop a device and method for updating a set of filling parameters for a wet plate clutch that improves and accelerates a learning process by using learned information to update the filling parameters for the wet plate clutch.

SUMMARY OF THE INVENTION

Presently provided by the invention, a device and method for updating a set of filling parameters for a wet plate clutch that improves and accelerates a learning process by using a learned information to update the filling parameters for the wet plate clutch, has surprisingly been discovered.

In one embodiment, the present invention is directed to a method for updating a set of filling parameters for a wet clutch system. The wet clutch system comprises a piston which is movably disposed in a housing, a proportional valve for regulating a pressure of a hydraulic fluid in the housing, a controller for controlling the proportional valve, and a sensor for measuring a response of the wet clutch system. The piston is movable into an extended position by a preloaded spring and into a retracted position by applying an engagement pressure on the piston by the hydraulic fluid. In the retracted position torque is transmittable through a clutch. The method comprises the steps of: providing the wet clutch system, providing the set of filling parameters for the wet clutch system, actuating the wet clutch system based on at least one of the set of filling parameters, sensing a response of the wet clutch system during actuation of the wet clutch system, comparing an observed filling parameter to at least one of the set of filling parameters, calculating a fill error between the observed filling parameter and the at least one of the set of filling parameters, and adjusting a plurality of the set of filling parameters based on the fill error.

In another embodiment, the present invention is directed to a method for updating a multidimensional matrix of filling parameters for a wet clutch system. The wet clutch system comprises a piston which is movably disposed in a housing, a proportional valve for regulating a pressure of the hydraulic fluid in the housing, a controller controlling the proportional valve, and a sensor for measuring a response of the wet clutch system. The piston is movable into an extended position by a preloaded spring and into a retracted position by applying an engagement pressure on the piston by the hydraulic fluid. In the retracted position torque is transmittable through a clutch. The method comprises the steps of providing the wet clutch system, providing the multidimensional matrix of filling parameters for the wet clutch system, actuating the wet clutch system based on at least one of the multidimensional matrix of filling parameters, sensing a response of the wet clutch system during actuation of the wet clutch system, comparing an observed filling parameter to at least one of the multidimensional matrix of filling parameters, calculating a fill error between the observed filling parameter and the at least one of the multidimensional matrix of filling parameters, calculating a correction factor based on the fill error, and adjusting a plurality of the multidimensional matrix of filling parameters based on the correction factor.

In another embodiment, the present invention is directed to a system for updating a set of filling parameters for a wet clutch system. The system for updating a set of filling parameters comprises the wet clutch system, a controller, and a sensor. The wet clutch system comprises a piston movably disposed in a housing and a proportional valve for regulating a pressure of the hydraulic fluid in the housing. The piston is movable into an extended position by a preloaded spring and a retracted position by applying an engagement pressure on the piston by a hydraulic fluid. In the retracted position torque is transmittable through a clutch. The controller controls the proportional valve. The sensor measures a response of the wet clutch system, and actuating the wet clutch system is based on at least one of the set of filling parameters. A response of the wet clutch system is sensed during actuation of the wet clutch system and an observed filling parameter is compared to at least one of the set of filling parameters. A fill error between the observed filling parameter and the at least one of the set of filling parameters is calculated and a plurality of the set of filling parameters based on the fill error is adjusted.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

A system and method for updating a set of fill parameters for a wet plate clutch which uses cross learning is described herein. The system and method improves and accelerates a learning process by using a learned information to update the parameters for other operating points of the wet plate clutch, in addition to a tested operating point. While the system and method is applied herein for use with the wet plate clutch for use with an off-highway stepped ratio transmission, it is understood that the system and method may be adapted for use with any system that includes a wet plate clutch.

Figure 1:
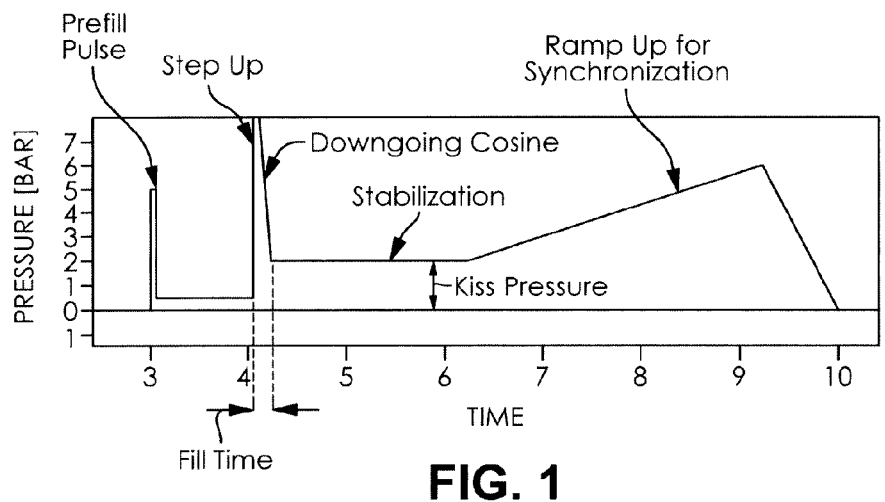
FIG. 1 is a graph which illustrates a pressure profile of an engaging hydraulic piston associated with a clutch system.
Figure 2:
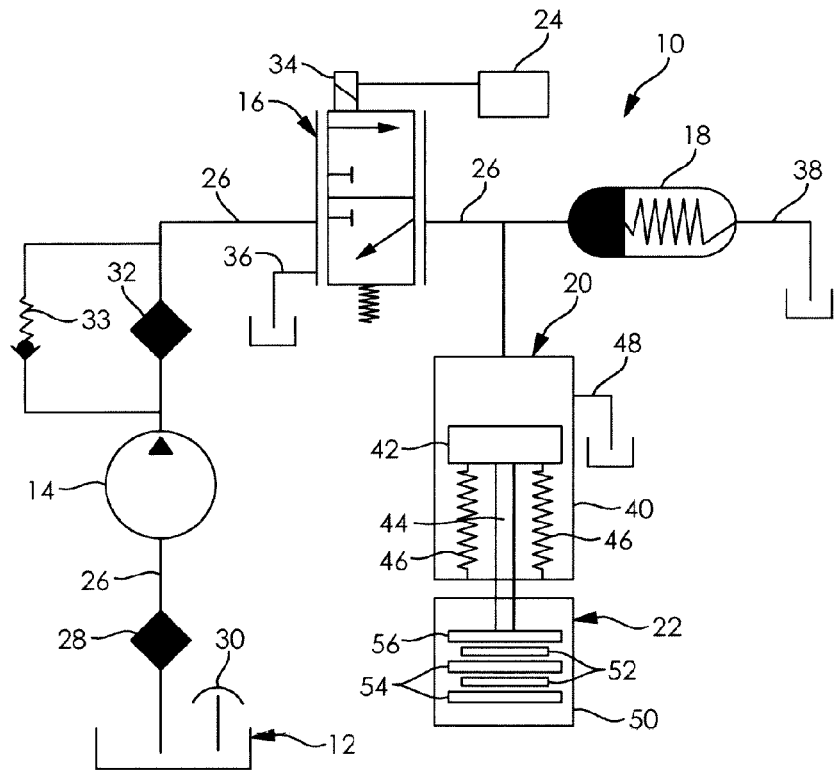
FIG. 2 is a schematic illustration of a clutch system according to the present invention.

FIG. 2 illustrates a clutch system 10 that may be used with the transmission. The clutch system 10 is an electrohydraulically actuated wet multi-plate clutch system. The clutch system 10 is an electrohydraulically actuated wet plate clutch system. The clutch system 10 comprises a sump 12, a high pressure pump 14, an electroproportional valve 16, an accumulator 18, a piston assembly 20, a clutch assembly 22, a controller 24, and a plurality of fluid conduits 26. The high pressure pump 14 is in fluid communication with the sump 12 and the electroproportional valve 16. The piston assembly 20 is in fluid communication with the electroproportional valve 16 and the accumulator 18. The clutch assembly 22 is disposed adjacent to and may be placed in contact with a portion of the piston assembly 20. The controller 24 is in communication with the electroproportional valve 16. A signal from a pressure sensor (not shown) in communication with the controller 24, which may be integrated into the electroproportional valve 16 or a signal from a speed sensor (not shown) in communication with the controller 24, which may form a portion of the clutch assembly 22 is used to assess the filling quality of the clutch system 10. The speed sensor is configured to measure rotational speeds of an input and an output associated with the clutch assembly 22. Further, it is understood that a torque sensor (not shown) or an accelerometer (not shown) in communication with the controller 24 may form a portion of the clutch system 10.

The sump 12 is a container in which a hydraulic fluid is stored. The sump 12 is in fluid communication with the high pressure pump 14. One of the fluid conduits 26 affords fluid communication between the sump 12 and the high pressure pump 14. A filter 28 forms a portion of the fluid conduit 26 between the sump 12 and the high pressure pump 14. The sump 12 includes a breather 30, to facilitate fluid communication between an ambient environment of the clutch system 10 and an interior of the sump 12.

The high pressure pump 14 is a fixed displacement hydraulic pump. The high pressure pump 14 is in fluid communication with the sump 12 and the electroproportional valve 16. As a non-limiting example, the high pressure pump 14 may generate a pressure of about 20 bar. One of the fluid conduits 26 affords fluid communication between the high pressure pump 14 and the electroproportional valve 16. A filter 32 forms a portion of the fluid conduit 26 between the high pressure pump 14 and the electroproportional valve 16. A pressure relief valve 33 is present to limit a pressure difference across the filter 32 created by the high pressure pump 14, such as if the filter 32 becomes obstructed. Further, it is understood that the high pressure pump 14 may also be in fluid communication with a pressure limiting valve (not shown). The pressure limiting valve limits a pressure within the fluid conduit 26 between the high pressure pump 14 and the electroproportional valve 16.

The electroproportional valve 16 is a hydraulic valve in fluid communication with the high pressure pump 14, the piston assembly 20, and the accumulator 18. The electroproportional valve 16 is in electrical communication with the controller 24. The electroproportional valve 16 is supplied with a pulse width modulated signal to apply a current to a solenoid 34 forming a portion of the electroproportional valve 16. Upon receipt of the pulse width modulated signal, the electroproportional valve 16 may be placed in at least a partially open position. In the open position, the electroproportional valve 16 afford fluid communication between the fluid conduit 26 between the high pressure pump 14 and the electroproportional valve 16 and a fluid conduit 26 between the electroproportional valve 16, the piston assembly 20, and the accumulator 18. It is understood that the controller 24 may adjust the pulse width modulated signal to adjust a pressure within the fluid conduit 26 between the electroproportional valve 16, the piston assembly 20, and the accumulator 18 by placing the electroproportional valve 16 in at least the partially open position. As shown in FIG. 2, the electroproportional valve 16 includes a draining orifice 36. A flow of hydraulic fluid through the draining orifice 36 is dependent on a pressure within the electroproportional valve 16, but also a viscosity of the hydraulic fluid and a temperature of the hydraulic fluid.

The accumulator 18 is a hydraulic device that dampens rapid changes in pressure (such as pressure drops or pressure peaks) within the fluid conduit 26 between the electroproportional valve 16 and the piston assembly 20. The accumulator 18 facilitates smooth operation of the clutch assembly 22. The accumulator 18 is in fluid communication with the piston assembly 20 and the electroproportional valve 16. As shown in FIG. 2, the accumulator 18 includes a draining orifice 38. A flow of hydraulic fluid through the draining orifice 38 is dependent on a pressure within the fluid conduit 26 between the electroproportional valve 16 and the piston assembly 20, but also a viscosity of the hydraulic fluid and a temperature of the hydraulic fluid.

The piston assembly 20 comprises a housing 40, a piston 42, a piston rod 44, and at least one return spring 46. The housing 40 is a hollow, cylindrical member in fluid communication with the electroproportional valve 16 through the fluid conduit 26 between the electroproportional valve 16, the piston assembly 20, and the accumulator 18. The piston 42 is a cylindrical member sealingly and slidingly disposed within the housing 40. The piston rod 44 is an elongate member in driving engagement with the piston 42. The piston rod 44 is sealingly and slidingly disposed through the housing 40. The at least one return spring 46 is a biasing member disposed between the piston 42 and the housing 40. When pressure at or above an engagement threshold is applied to the housing 40 by the electroproportional valve 16, the pressure within the housing 40 urges the piston 42 and the piston rod 44 towards the clutch assembly 22, while also compressing the at least one return spring 46. When pressure at or below a disengagement threshold is present within the housing 40, the at least one return spring 46 urges the piston 42 and the piston rod 44 into a starting position. As shown in FIG. 2, the housing 40 includes a draining orifice 48. A flow of hydraulic fluid through the draining orifice 48 is dependent on a pressure within the housing 40, a portion of which may be generated by centripetal forces, but also a viscosity of the hydraulic fluid and a temperature of the hydraulic fluid.

The clutch assembly 22 comprises a housing 50, a first plurality of plates 52, a second plurality of plates 54, and a pressure plate 56. The housing 50 is a hollow member into which a transmission fluid is disposed. The first plurality of plates 52 and the second plurality of plates 54 are rotatingly disposed within the housing 50. The pressure plate 56 is disposed adjacent the first plurality of plates 52 and the second plurality of plates 54 and may be urged towards the first plurality of plates 52 and the second plurality of plates 54 by the piston rod 44. The first plurality of plates 52 is interleaved with the second plurality of plates 54. Within the clutch assembly 22, an input member (not shown) is drivingly engaged with one of the first plurality of plates 52 and the second plurality of plates 54 and an output member (not shown) is drivingly engaged with a remaining one of the first plurality of plates 52 and the second plurality of plates 54. A pressure in which the piston rod 44 contacts the pressure plate 56 and where additional pressure would result in at least variable driving engagement between the first plurality of plates 52 and the second plurality of plates 54 is known as a kiss pressure. At pressures greater than the kiss pressure, torque is able to be transferred from the first plurality of plates 52 to the second plurality of plates 54 or from the second plurality of plates 54 to the first plurality of plates, depending on a configuration of the clutch assembly 22. When pressure at or above the engagement threshold is applied to the housing 40 by the electroproportional valve 16, the pressure within the housing 40 urges the piston 42 and the piston rod 44 towards the clutch assembly 22, applying a pressure to the first plurality of plates 52 and the second plurality of plates 54 through the pressure plate 56. In response to the pressure, the first plurality of plates 52 becomes at least variably drivingly engaged with the second plurality of plates 54, causing the input member to be at least variably drivingly engaged with the output member.

It is understood that the schematic illustration shown in FIG. 2 is merely exemplary in nature, and that the invention may be adapted for use with any wet plate clutch system.

The method for updating a set of filling parameters for the clutch system comprises several steps to update the set of filling parameters, which are detailed hereinbelow.

Due to a nonlinear and essentially unknown relationship between the set of fill parameters and the variables that describe the conditions for which the fill parameters are scheduled, it is not possible to extrapolate a calculated update to other conditions. However, for conditions which are close to the conditions in which an error was observed, the system assumes that such behavior is related.

Given a pivot element and a newly calculated update for the pivot element, it is desired to apply a new calculated correction to the multidimensional matrix where the elements of the multidimensional matrix (which have a greater density of update) are closer to the pivot element. It should be noted that the pivot element may not correspond to one of the grid points of the multidimensional matrix.

When a fill error is detected at a certain operating point a correction factor is calculated based on the condition present when the fill error is detected to improve the filling process. The correction factor may be an additive correction factor or a multiplicative correction factor. Where the correction factor is the additive correction factor, the previous value of the fill parameter in the considered conditions is augmented with the correction factor or the correction factor is subtracted from the previous value of the fill parameter value.

Where the correction factor is the multiplicative correction, the previous value of the fill parameter is multiplied with the correction factor. An absolute correction is needed to distribute the update to the other points in the multidimensional matrix. In the case of the additive correction factor, the absolute correction is the correction factor itself. In the case of the multiplicative correction factor, the absolute correction is the correction factor multiplied with the fill parameter the correction factor has been calculated for. The fill parameter may be available from a high level controller, or it is interpolated from a fill parameter matrix for the relevant conditions.

The fill error can then be distributed using a multivariate Gaussian plane method, a surface gradient method, and a matrix revision method.

Figure 3A:
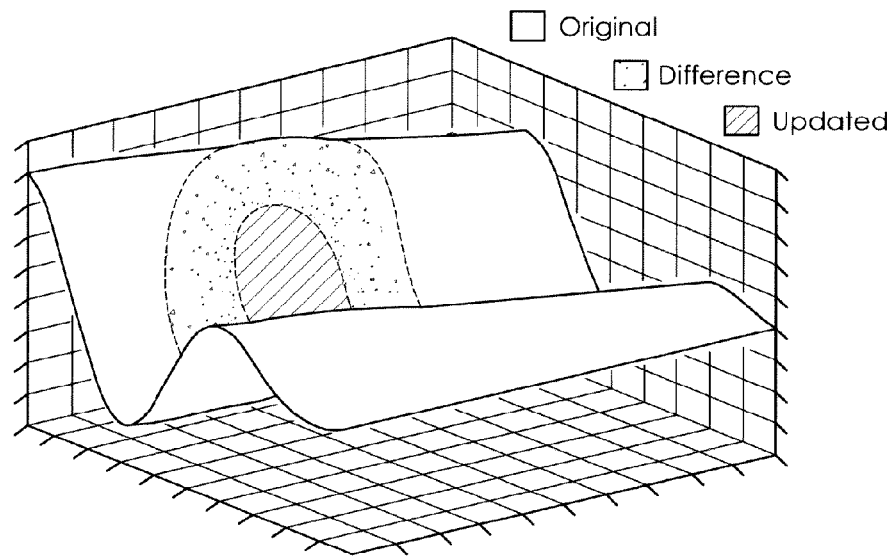
FIG. 3A is a graph which illustrates an updated parameter plane and an original parameter plane of a multidimensional matrix; the graph illustrating the effect of updating the multidimensional matrix.
Figure 3B:
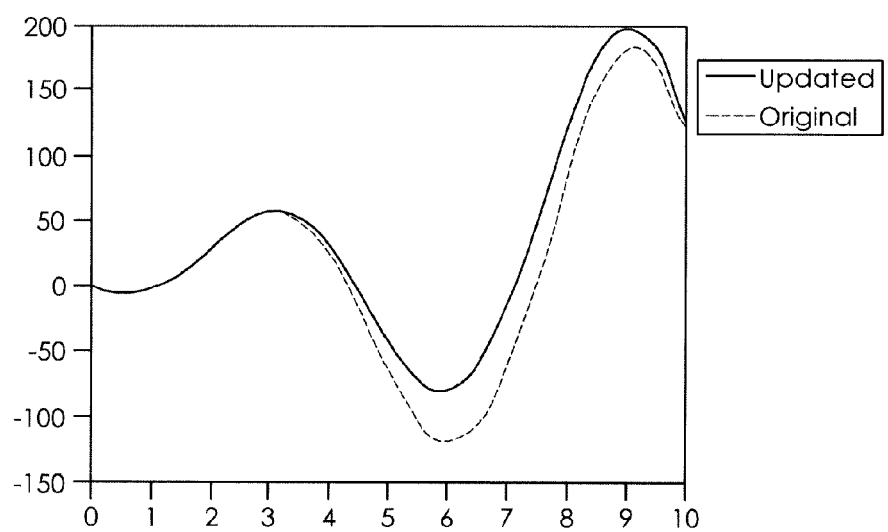
FIG. 3B is a graph which illustrates a section through the parameter plane and the original parameter plane shown in FIG. 3A.

In the Gaussian plane method, an error on a given parameter can be distributed to a surrounding plurality of points in the multidimensional matrix. A Gaussian possibility distribution is created, which is centered on an interpolated point in a fill parameter matrix. A variance on the Gaussian possibility distribution indicates how large of a region in the multidimensional matrix around the interpolation points will be updated. The variance can be tuned in response to a given application. The variance can also be adjusted online, as a function of a confidence level of the calculated correction. An effect of updating the multidimensional matrix in this manner can be seen in FIGS. 3A and 3B. FIGS. 3A and 3B illustrate an updated parameter plane and an original parameter plane. FIG. 3A illustrates an updated parameter plane and an original parameter plane of the multidimensional matrix; the graph illustrating the effect of updating the multidimensional matrix. FIG. 3B is a graph which illustrates a section through the parameter plane and the original parameter plane shown in FIG. 3A; the graph illustrating the effect of updating the multidimensional matrix. The updated parameter plane is pulled upwards at the interpolation point for a region surrounding the interpolation point.

Figure 4A:
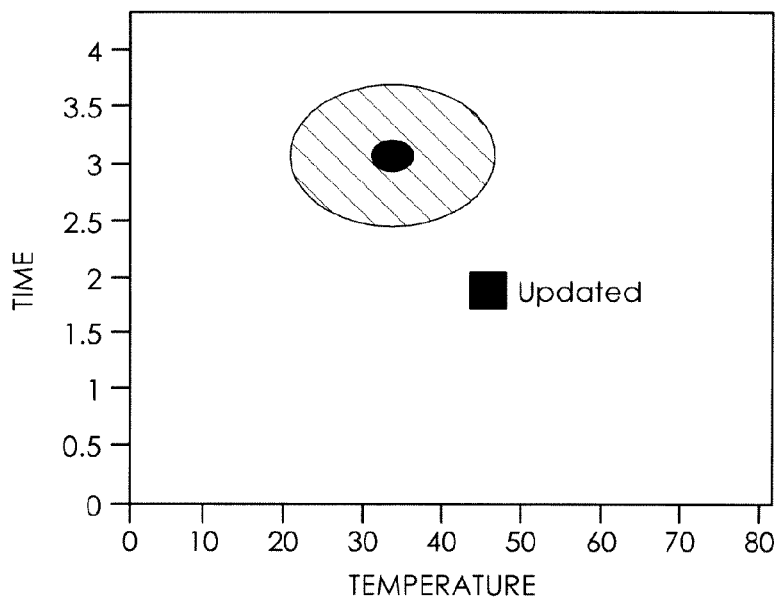
FIG. 4A is a graph which illustrates an updated section of the multidimensional matrix shown in FIG. 3A, the updated section having a first asymmetric distribution profile.
Figure 4B:
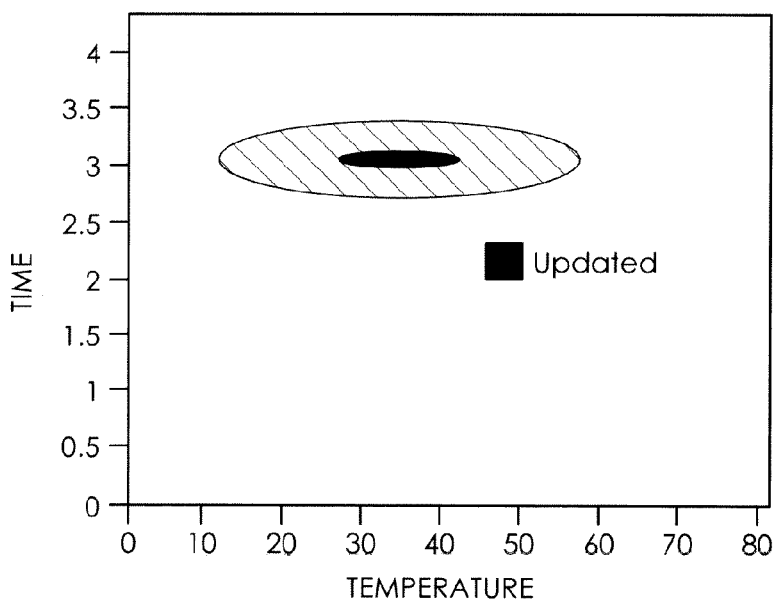
FIG. 4B is a graph which illustrates an updated section of the multidimensional matrix shown in FIG. 3A, the updated section having a second asymmetric distribution profile.

A distribution profile can be made asymmetric, in order to learn more in a certain direction. The effect of the distribution profile which is asymmetric can be seen in FIGS. 4A and 4B, which shows an updated region of the multidimensional matrix. FIG. 4A is a graph which illustrates an updated section having a first asymmetric distribution profile. FIG. 4B is a graph which illustrates an updated section having a second asymmetric distribution profile. The distribution profile which is asymmetric may be preferred in a given situation, for example, when the behavior of the system is more linearly coherent in function of temperature than as a function of time between shifts.

In the surface gradient method, a surface is fitted through the interpolation point and the points in the matrix. The points in the matrix are then updated within a certain distance (which may be asymmetric). The points also take into account a gradient of the original surface. When the gradient of the original surface is large, there is a strong change in the fill parameter. When the gradient of the original surface is large, there is a presumption that a relationship with the interpolation point is less strong. As such, points having a large gradient and points beyond that in the same direction will be less adapted.

In the matrix revision method, the interpolation point where a shift is performed can be added to the multidimensional matrix. As most of such shifts are performed in a nominal working regime, a resolution of the fill parameter matrix will become denser in such a region. The advantage of such a revision strategy is that only a portion of the multidimensional matrix has to have the same fine grid and that the nominal operating region is learned rather than predefined. When limited memory is a concern, a number of grid points of the matrix are also limited. As new points are added to the multidimensional matrix, points of the matrix that are determined to be irrelevant or that were never used can be forgotten. Such a process increases an efficiency of the multidimensional matrix. Further, the matrix revision method may be advantageous when extrapolation is needed, as extrapolation is needed to obtain parameters from outside of boundaries of the multidimensional matrix. If a following shift occurs in similar conditions outside of the multidimensional matrix, extrapolation might not be necessary or at least the quality of the extrapolation result may be improved.

A distance measure in which the points are updated can be asymmetric; however, it may also be quantified in different ways. The distance measure may be based on a fixed distance in terms of time between shifts or temperature. Alternately, the distance measure may be specified as a number of points on the axes of the multidimensional matrix. In a first example, as interpolation points are added to the multidimensional matrix, more points will be updated, but within the same region. In a second example, a number of updated points will not increase, but in denser regions, a smaller part of the multidimensional matrix will be updated. In the second example, such a result is acceptable as it is presumed that the data in such areas is fairly accurate. Conversely, however, it is understood that in less dense regions a larger part of the matrix is updated.

The system and method for updating the set of fill parameters for the wet plate clutch greatly improves a filling of wet plate clutches through an online learning of a plurality of fill parameters. The system and method facilitates learning of the plurality of fill parameters for other conditions than the conditions in which a previous shift was evaluated. As a result, a convergence to optimized fill parameters occurs at a faster rate and a higher consistency between shifts is achieved. Further, a plurality of known characteristics of the system can be taken into account to further speed up the process and make the process more robust. In an alternative implementation, a finer grid can be constructed in a region of the nominal working regime, which results in improved accuracy under such conditions.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for updating a set of filling parameters for a wet clutch system, the method comprising the steps of:
    providing the wet clutch system, the wet clutch system comprising:
        a piston being movably disposed in a housing, the piston being movable into an extended position by a preloaded spring and into a retracted position by applying an engagement pressure on the piston by a hydraulic fluid, wherein in the retracted position torque is transmittable through a clutch,
        a proportional valve disposed for regulating a pressure of the hydraulic fluid in the housing,
        a controller controlling the proportional valve,
        a sensor for measuring a response of the wet clutch system;
    providing the set of filling parameters for the wet clutch system;
    actuating the wet clutch system based on at least one of the set of filling parameters;
    sensing a response of the wet clutch system during actuation of the wet clutch system;
    comparing an observed filling parameter to at least one of the set of filling parameters;
    calculating a fill error between the observed filling parameter and the at least one of the set of filling parameters; and
    adjusting a plurality of the set of filling parameters based on the fill error.

2. The method according to claim 1, wherein the set of filling parameters for the wet clutch system comprises a multidimensional matrix.

3. The method according to claim 1, further comprising the step of calculating a correction factor based on the fill error.

4. The method according to claim 3, wherein the step of adjusting a plurality of the set of filling parameters is based on the correction factor.

5. The method according to claim 3, wherein the correction factor is one of an additive correction factor and a multiplicative correction factor.

6. The method according to claim 1, wherein the step of adjusting a plurality of the set of filling parameters based on the fill error is distributed using one of a Gaussian plane method, a surface gradient method, and a matrix revision method.

7. The method according to claim 6, wherein the step of adjusting a plurality of the set of filling parameters based on the fill error is distributed according to a variance using the Gaussian plane method.

8. The method according to claim 7, wherein the variance is one of adjusted in response to a given application and adjusted as a function of a confidence level of the fill error.

9. The method according to claim 6, wherein the step of adjusting a plurality of the set of filling parameters based on the fill error is distributed in an asymmetric manner using the Gaussian plane method.

10. The method according to claim 6, wherein the step of adjusting a plurality of the set of filling parameters based on the fill error is distributed by fitting a surface through an interpolation point based on the fill error and a plurality of points defined by the filling parameters using the surface gradient method.

11. The method according to claim 6, wherein the step of adjusting a plurality of the set of filling parameters based on the fill error is distributed by adding an interpolation point based on the fill error to a plurality of points defined by the filling parameters using the matrix revision method.

12. The method according to claim 11, wherein by adding an interpolation point based on the fill error to a plurality of points defined by the filling parameters using the matrix revision method, a multidimensional matrix defined by the set of filling parameters becomes denser.

13. The method according to claim 12, wherein when the multidimensional matrix defined by the set of filling parameters becomes denser, irrelevant information may be removed from the multidimensional matrix.

14. The method according to claim 11, wherein the matrix revision method is used to add an extrapolation point based on the fill error to a plurality of points defined by the filling parameters, the extrapolation point outside of boundaries of the plurality of points defined by the filling parameters.

15. A method for updating a multidimensional matrix of filling parameters for a wet clutch system, the method comprising the steps of:

providing the wet clutch system, the wet clutch system comprising:
  a piston being movably disposed in a housing, the piston being movable into an extended position by a preloaded spring and into a retracted position by applying an engagement pressure on the piston by a hydraulic fluid, wherein in the retracted position torque is transmittable through a clutch,
  a proportional valve for regulating a pressure of the hydraulic fluid in the housing,
  a controller controlling the proportional valve,
  a sensor for measuring a response of the wet clutch system;
providing the multidimensional matrix of filling parameters for the wet clutch system;
actuating the wet clutch system based on at least one of the multidimensional matrix of filling parameters;
sensing a response of the wet clutch system during actuation of the wet clutch system;
comparing an observed filling parameter to at least one of the multidimensional matrix of filling parameters;
calculating a fill error between the observed filling parameter and the at least one of the multidimensional matrix of filling parameters;
calculating a correction factor based on the fill error; and
adjusting a plurality of the multidimensional matrix of filling parameters based on the correction factor.

16. A system for updating a set of filling parameters for a wet clutch system, the system comprising:
the wet clutch system, the wet clutch system comprising:
  a piston being movably disposed in a housing, the piston being movable into an extended position by a preloaded spring and into a retracted position by applying an engagement pressure on the piston by a hydraulic fluid, wherein in the retracted position torque is transmittable through a clutch,
  a proportional valve for regulating a pressure of the hydraulic fluid in the housing;
a controller controlling the proportional valve; and
a sensor for measuring a response of the wet clutch system, wherein actuating the wet clutch system is based on at least one of the set of filling parameters, a response of the wet clutch system is sensed during actuation of the wet clutch system, an observed filling parameter is compared to at least one of the set of filling parameters, a fill error between the observed filling parameter and the at least one of the set of filling parameters is calculated, and a plurality of the set of filling parameters based on the fill error is adjusted.

17. The system according to claim 16, wherein the set of filling parameters for the wet clutch system comprises a multidimensional matrix.

18. The system according to claim 16, wherein a correction factor based on the fill error is calculated.

19. The system according to claim 18, wherein a plurality of the set of filling parameters is adjusted based on the correction factor.

20. The system according to claim 18, wherein the correction factor is one of an additive correction factor and a multiplicative correction factor.

* * * * *